(12) United States Patent
LaMothe et al.

(10) Patent No.: US 8,475,286 B2
(45) Date of Patent: Jul. 2, 2013

(54) ARTICULATION STOP

(75) Inventors: Eric LaMothe, Goodrich, MI (US);
Noel Sutton, Auburn Hills, MI (US);
Donald Dine, Whitehouse, OH (US);
Albert D. Webb, Auburn Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 30 days.

(21) Appl. No.: 12/808,384

(22) PCT Filed: Jan. 20, 2009

(86) PCT No.: PCT/US2009/031424
§ 371 (c)(1),
(2), (4) Date: Sep. 24, 2010

(87) PCT Pub. No.: WO2009/092078
PCT Pub. Date: Jul. 23, 2009

(65) Prior Publication Data
US 2011/0021277 A1   Jan. 27, 2011

Related U.S. Application Data

(60) Provisional application No. 61/021,805, filed on Jan. 17, 2008.

(51) Int. Cl.
*F16D 3/205* (2006.01)

(52) U.S. Cl.
USPC .......................... 464/111; 464/173

(58) Field of Classification Search
USPC ............... 464/111, 117, 118, 123, 124, 173, 464/905
See application file for complete search history.

(56) References Cited

U.S. PATENT DOCUMENTS

| | | | | |
|---|---|---|---|---|
| 1,967,842 | A | * | 7/1934 | Raviola et al. ............... 464/173 |
| 2,927,444 | A | * | 3/1960 | Wildhaber .................... 464/123 |
| 3,318,108 | A | * | 5/1967 | Cadion .................... 464/111 X |
| 5,951,401 | A | * | 9/1999 | Kita et al. .................... 464/905 |
| 6,793,584 | B2 | | 9/2004 | Ramey et al. |
| 7,137,895 | B2 | | 11/2006 | Ishijima et al. |
| 2006/0217208 | A1 | | 9/2006 | Worman, Jr. et al. |

* cited by examiner

*Primary Examiner* — Gregory Binda
(74) *Attorney, Agent, or Firm* — Jennifer M. Brumbaugh; Rader, Fishman & Grauer PLLC

(57) ABSTRACT

A joint apparatus includes an outer joint portion having an opening end, an outer joint axis, and an outer joint inside surface defining, at least in part, an internal vault. The joint apparatus also includes an inner joint portion including a spider interposed within the outer joint portion and a shaft extending through the opening end. The spider includes a trunnion. The trunnion is at least partially interposed within the vault. The shaft defines a shaft axis. The inner joint portion includes an angular range of motion limiting device that selectively restricts the articulation of the shaft relative to the outer joint to prevent the shaft from contacting the outer joint.

16 Claims, 14 Drawing Sheets

ARTICULATION STOP

TECHNICAL FIELD

The disclosure relates generally to articulated joints, and more specifically to a system and method for limiting the angular deflection of an articulated joint.

BACKGROUND ART

Constant velocity joints (CVJs) and other rotational joints are common components in automotive vehicles. Typically, constant velocity joints are used where a transmission of constant velocity rotating motion is required. The common types of constant velocity joints are plunging tripod, a fixed tripod, a plunging ball joint and a fixed ball joint. These types of joints are currently used in front wheel drive vehicles, rear wheel drive vehicles and on propeller shafts found in rear wheel drive, all wheel drive, and four wheel drive vehicles. The constant velocity joints are generally grease lubricated for life and sealed by a sealing boot when used on driveshafts or half shafts. Therefore, constant velocity joints are sealed in order to retain grease inside the joint and keep contaminates, such as dirt and water out of the joint. To achieve this protection the constant velocity joint is usually enclosed at the opened end of an outer race by a sealing boot made of a rubber, thermoplastic, or silicone type material. The opposite end of the outer race generally is enclosed by a dome or cap, known as a grease cap in the case of a disc-type joint. A mono block or integral stem and race design style joint is sealed by the internal geometry of the outer race. Sealing and protection of the constant velocity joint is necessary because contamination of the inner chamber of the joint generally will cause damage to the joint.

A main function of the constant velocity joint is the transmission of rotational forces and torque. A plunging joint will transmit rotational velocity while permitting relative axial displacement within the joint. Generally, a tripod joint operates as a plunging constant velocity joint while providing some degree of axial articulation. In typical joint assemblies, a variety of bolted joint designs are used to assemble a joint to a propeller shaft or halfshaft (sideshaft) within the automotive vehicle. These propeller shaft and halfshaft assemblies are typically assembled prior to installation within a driveline of a vehicle.

When a propeller shaft is installed within a vehicle, the maximum angle between the ends of the individual joints is limited by other components of the driveline and the vehicle. Before an assembled propeller shaft is installed into a vehicle, the individual joints may be manipulated into configurations that include angles between the ends of the individual joints that exceed the maximum angles experienced during operation. Excessive manipulation may result in configurations of individual joints that may damage components, such as the joint boot. Of concern is the boot of a tripod joint in a propeller shaft where the tripod joint geometry allows the shaft of the tripod joint to pinch a portion of the flexible boot, possibly damaging the boot and reducing the expected boot life. Therefore, a need exists for a system for limiting the articulation (non-axial angular rotation of the shaft) of a tripod joint, or other joints, to prevent boot damage prior to and during propeller shaft installation.

DISCLOSURE OF THE INVENTION

The present application discloses a joint apparatus having an outer joint portion having an opening end, an outer joint axis, and an outer joint inside surface defining, at least in part, an internal vault. The joint apparatus also includes an inner joint portion including a spider interposed within the outer joint portion and a shaft, defining a shaft axis, extending through the opening end. The spider includes a trunnion. The trunnion is at least partially interposed within the vault. The inner joint portion includes an angular range of motion limiting device that selectively restricts articulation of the joint.

BRIEF DESCRIPTION OF DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
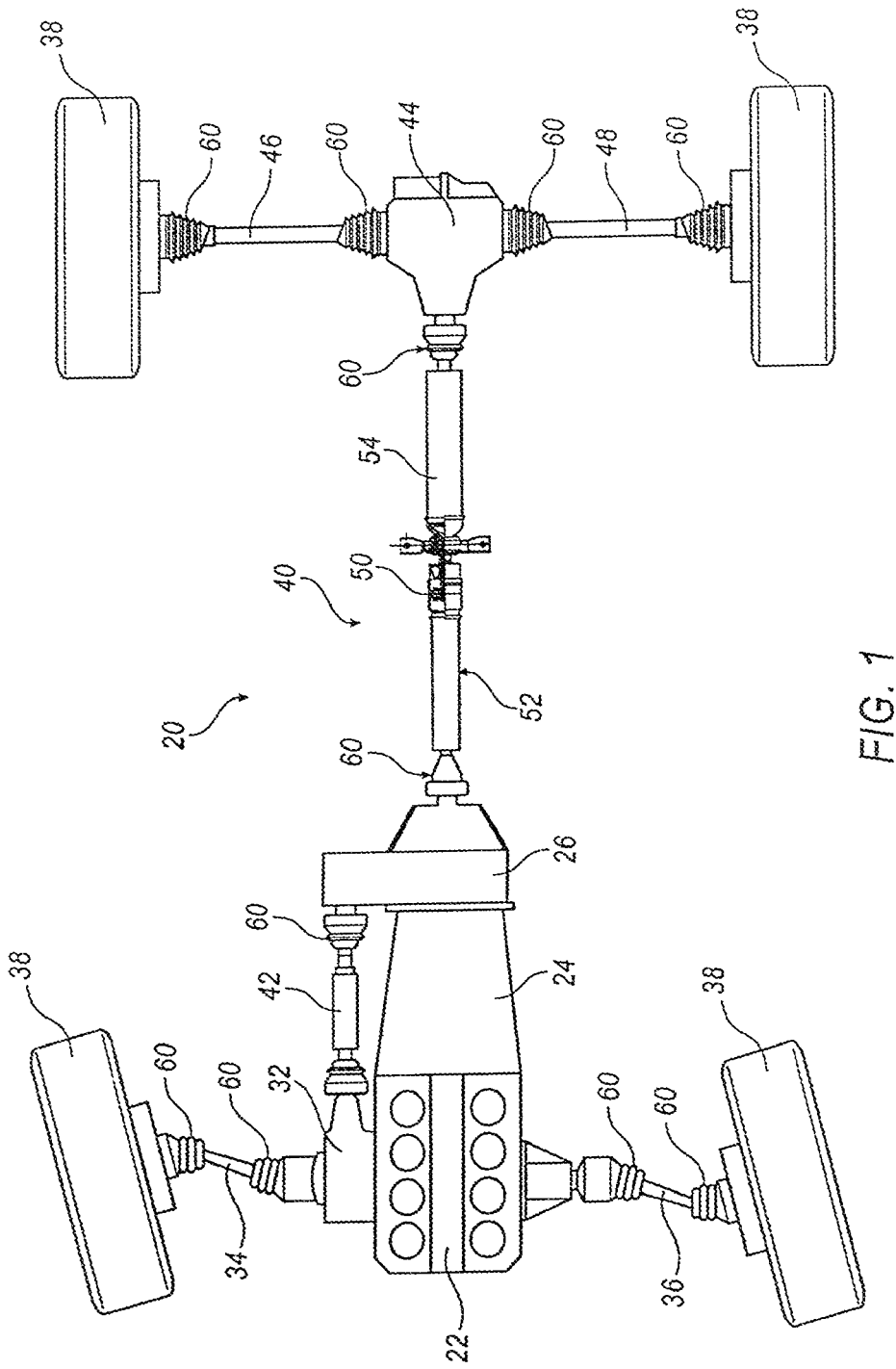
FIG. 1 is a top view of a driveline system.

FIG. 1 illustrates a driveline 20 of a vehicle (not shown). The driveline 20 includes an engine 22 that is connected to a transmission 24 and a power take off unit 26. A front differential 32 has a right hand front half shaft 34 and a left hand front half shaft 36, each of which are connected to a wheel 38 and delivers power to those wheels 38. The power take off unit 26 has a propeller shaft 40 and a front wheel propeller shaft 42 extending therefrom. The front wheel propeller shaft 42 connects the front differential 32 to the power take off unit 26. The propeller shaft 40 connects the power take off unit 26 to a rear differential 44, wherein the rear differential 44 includes a rear right hand side shaft 46 and a rear left hand side shaft 48, each of which ends with a wheel 38 on one end thereof.

Figure 2:
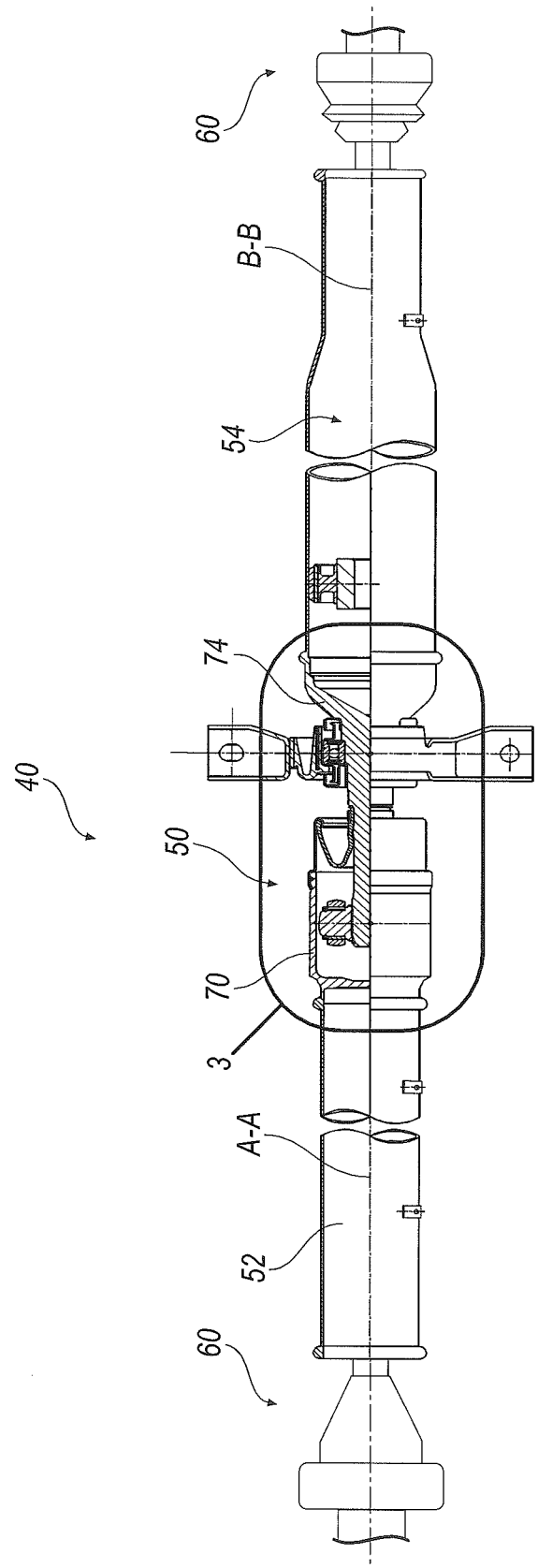
FIG. 2 is a partial sectional top view of the propeller shaft illustrated in FIG. 1.

The propeller shaft 40, as best seen in FIG. 2, includes a front propeller shaft 52, a rear propeller shaft 54, an articulated tripod joint 50 and two high speed constant velocity joints 60. The front propeller shaft 52 is defined by an axis A-A, and the rear propeller shaft 54 is defined by an axis B-B. The constant velocity joints 60 transmit power even if the wheels 38 or the shafts have changing angles due to steering and suspension jounce and rebound. Constant velocity joints 60 are also located on both ends of the half shafts 46, 48 that connect to the wheel 38 and the rear differential 44. Also, both ends of the right hand front half shaft 34 and left hand front half shaft 36 include constant velocity joints 60.

The constant velocity joints 60 may be of any of the standard types known, such as plunging tripod, cross groove joint, fixed ball joint, fixed tripod joint, or double offset joints, all of which are commonly known terms in the art for different varieties of constant velocity joints. The constant velocity joints 60 allow for transmission of constant velocities at angles which are found in everyday driving of automotive vehicles in both the halfshafts (sideshafts) and propeller shafts of these vehicles.

The driveline 20 represents an all wheel drive vehicle, however it should be noted that the embodiment of the constant velocity joints 60 of the current invention can also be used in rear wheel drive vehicles, front wheel drive vehicles, all wheel drive vehicles and four wheel drive vehicles.

Figure 3:
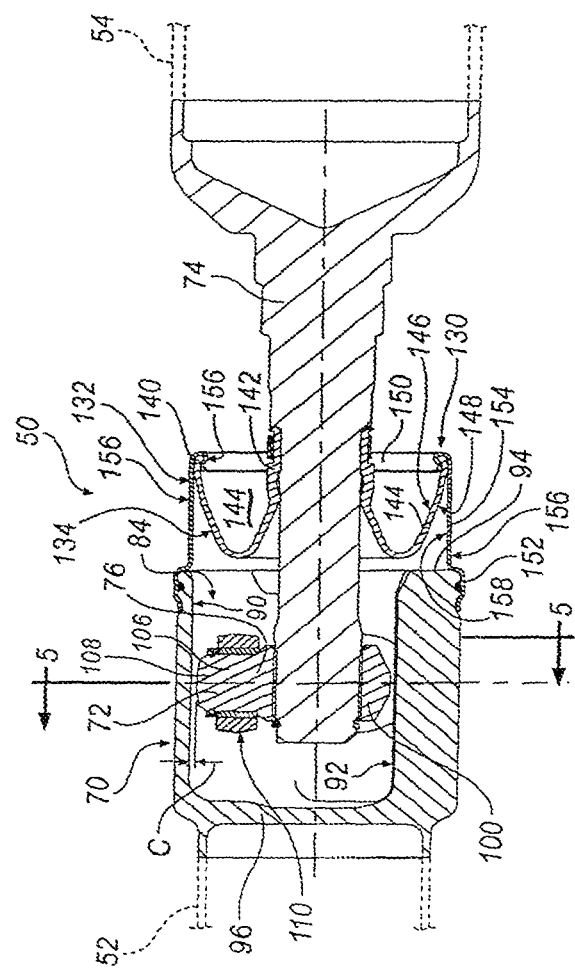
FIG. 3 is a partial sectional view of a portion of the propeller shaft of FIG. 2.
Figure 4:
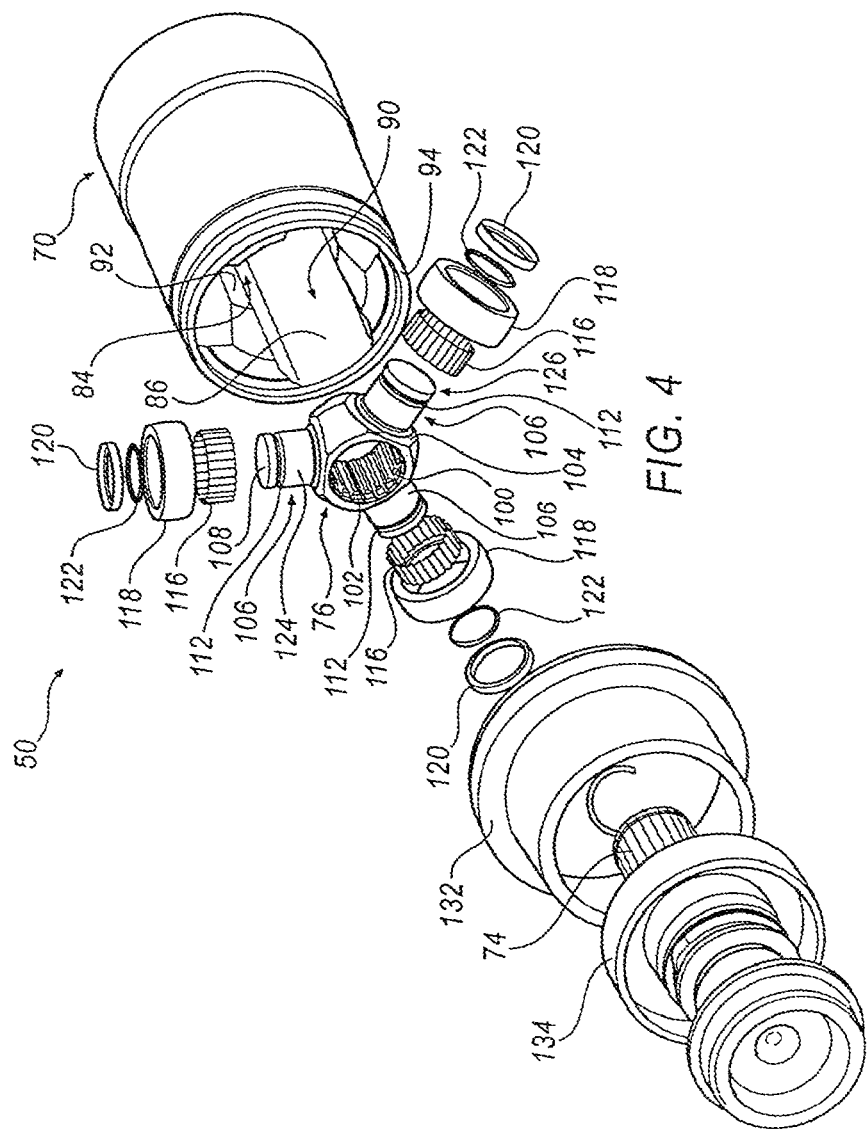
FIG. 4 is an exploded perspective view of a portion of a propeller shaft of FIG. 2.
Figure 5:
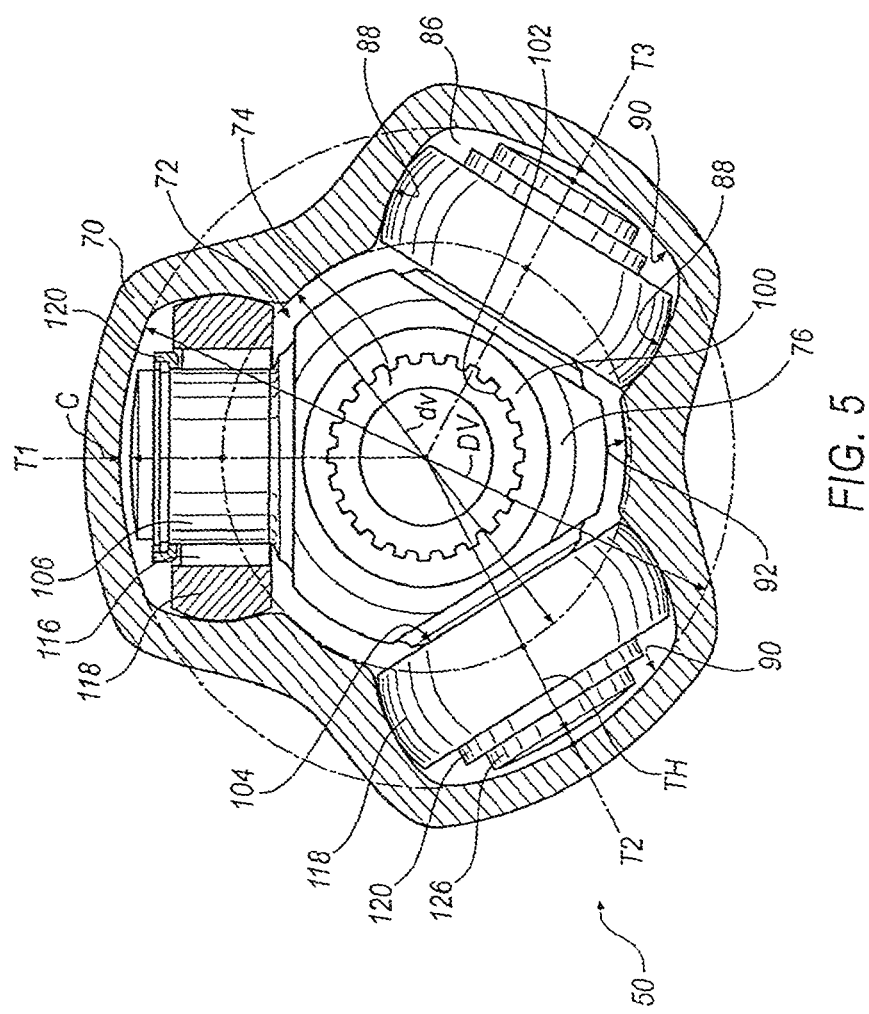
FIG. 5 is a sectional view taken along broken line 5-5 of FIG. 3, with some section graphics removed for clarity.

As best seen in FIGS. 3-5, the joint 50 includes a tulip, or an outer joint portion 70, connected to the front propeller shaft 52, and an inner joint portion 72. The inner joint portion 72 includes a shaft 74 connected to the rear propeller shaft 54. The inner joint portion 72 also includes a tripod, or spider, 76 splined to the shaft 74. As best seen in FIG. 2, the tulip 70 is also generally defined by the axis A-A of the front propeller shaft 52 and the shaft 74 is also generally defined by the axis B-B the rear propeller shaft 54.

The tulip 70 is provided with an inner recess 84 having three uniformly circumferentially distributed vaults 86. The vaults 86 form pairs of circumferentially opposed tracks 88 connected by a vault major surface 90 that extend from an opening end 94 of the tulip 70 to an annular wall 96. The tracks 88 of adjacent vaults 86 are connected by a tulip minor surface 92. The spider 76 includes an annular hub portion 100 provided with an aperture 102 for inserting the shaft 74 therein and three uniformly circumferentially distributed trunnion lands 104. As illustrated, the spider 76 is splined to the shaft 74 for rotation therewith. Extending from the hub portion 100 (at each trunnion land 104) are three uniformly circumferentially distributed trunnions 106 having axes T1, T2, and T3 having a trunnion crown 108 at a distal end. One trunnion 106 is interposed into each vault 86. A roller assembly 110 is interposed within each vault 86 with a trunnion 106 interposed therein. Each trunnion 106 includes a trunnion groove 112 formed therein. Each roller assembly 110 includes bearing needles 116 and rollers 118.

Each roller 118 with bearing needles 116 are axially restrained on each trunnion 106 by a retaining washer 120 and a securing ring 122. The securing ring 122 is retained within one trunnion groove 112 of each trunnion 106. In conjunction with the retaining washer 120, the securing ring 122 restrains each bearing needle 116 and roller 118 on each trunnion 106. The roller assemblies 110 are permitted to axially float along axes T1, T2, T3 between contact with the trunnion lands 104 and the securing rings 120. Generally, the vault major surface 90 is defined by a first vault diameter DV, and the tulip minor surface 92 is defined by a second vault diameter dv (FIG. 5). Each trunnion 106 includes a cylindrical outer surface 124 and a trunnion end 126. When the spider 76 is positioned concentric to the tulip 70, a clearance C is generally provided between each trunnion end 126 and vault major surface 90 (FIGS. 3 and 5).

As best illustrated in FIG. 5, the joint 50 may be trisected about the axes A-A and B-B into three generally equal portions. Each trunnion is generally defined by a trunnion radius TH extending to the trunnion end 126. When the joint 50 is in operation with the tulip 70 and shaft 74 generally axially aligned, the rotational forces within the joint 50 urge the axes A-A and B-B to be co-axial and the trunnions float within the roller assemblies 110 to provide a generally equal clearance C between each trunnion end 126 and vault major surface 90. That is, generally, the trunnion radius TH added to the clearance C will equal the first vault diameter DV.

As best seen in FIG. 3, the joint 50 also includes a boot assembly 130. The boot assembly 130 includes a boot can 132 and a flexible boot 134. The flexible boot 134 includes an outer bead end 140, an inner shaft end 142, a flexible portion 144 extending therebetween, an outer boot surface 146, and an inner boot surface 148. The boot can 132 includes a crimped end 150 that is folded over the bead end 140, a tulip end 152 connected to the tulip 70, a generally cylindrical can body 154 extending therebetween, an outer can surface 156, and an inner can surface 158.

Figure 6:
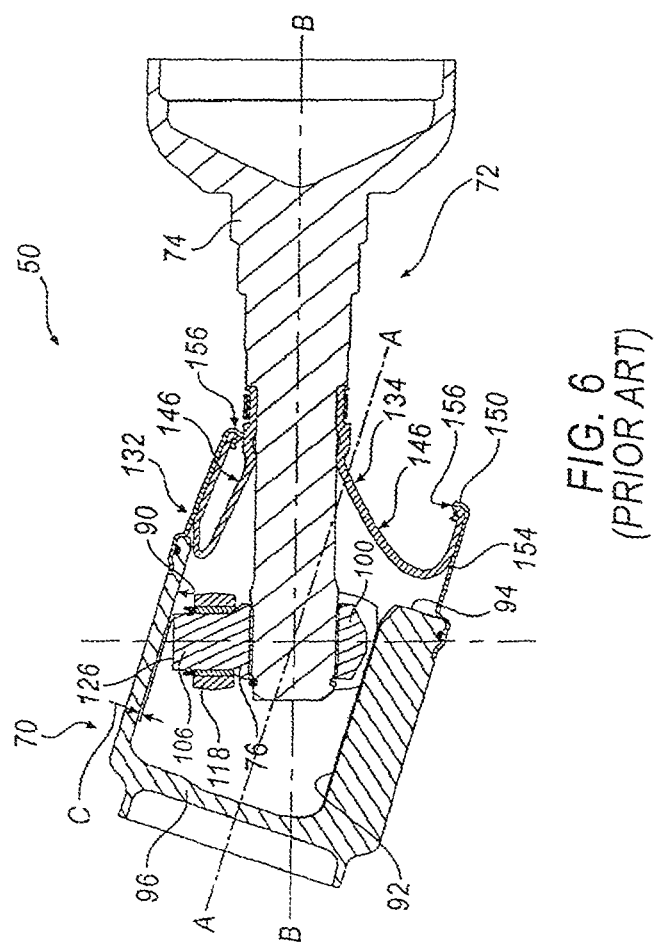
FIG. 6 is a partial sectional view of a portion of a prior art propeller shaft.

FIG. 6 illustrates the propeller shaft of FIGS. 1-5 in a prior art configuration, wherein like elements have like numbers. In the prior art configuration, the axis A-A of the front tulip 70 is not aligned with the axis B-B of the shaft 74. In the configuration illustrated, the joint 50 cannot rotate to the prior art configuration when installed in the driveline 20, but can only articulate to the prior art configuration when not fully installed in driveline 20 since the articulation of an assembled joint 50 is not limited prior to installation. When fully installed in the driveline 20, the joint 50 is permitted to articulate while being limited by the positioning of the shafts 52, 54 to a third configuration (not shown) that is an intermediate position between the axial alignment of FIG. 3 and the unhindered articulation of FIG. 6. That is, operation of the driveline 20 will desirably not involve interference of driveline components, such as contact between shaft 74 and front tulip 70, and generally the joints, such as joint 50 are dimensioned such that this contact will not occur with maximum articulation permitted by the driveline 20 as limited by the components of the driveline 20 that are generally fixed to the vehicle.

As best seen in comparing FIGS. 3 and 6, the clearance C between each trunnion end 126 and vault major surface 90 permits the shaft 74 to articulate relative to the tulip 70. However, FIG. 6 illustrates that the shaft 74 may articulate relative to the tulip 70 until the outer can surface 156 of the crimped end 150 of the boot can 132 contacts the outer boot surface 146 of the boot 134. This contact may result in damage to the boot 134 up to and including failure of the boot 134 to operate as intended. Damage experienced has included undesired lacerated portions of the boot 134.

FIGS. 3 and 6 also illustrate that the tulip 70 may be axially displaced relative to the shaft 74. When the joint 50 is not fully installed, this relative axial displacement is limited by contact between the shaft 74 and/or spider 76 and wall 96 at a full shaft insertion configuration (not shown) and extension of the boot 134 at a shaft extended configuration (not shown). Damage to the boot may occur at various amounts of axial displacement between the tulip 70 and the shaft 74 between the full shaft insertion configuration and the shaft extended configuration when the joint 50 is not fully installed. When fully installed (FIG. 1), the plunge of joint 50 includes relative axial displacement between the shaft 74 and tulip 70 that is not limited by contact or interference between components of the joint 50. That is, when fully installed in the driveline 20, the joint 50 is limited by other components of the driveline 20 and not permitted to plunge to either the full shaft insertion configuration or the shaft extended configuration.

Figure 7:
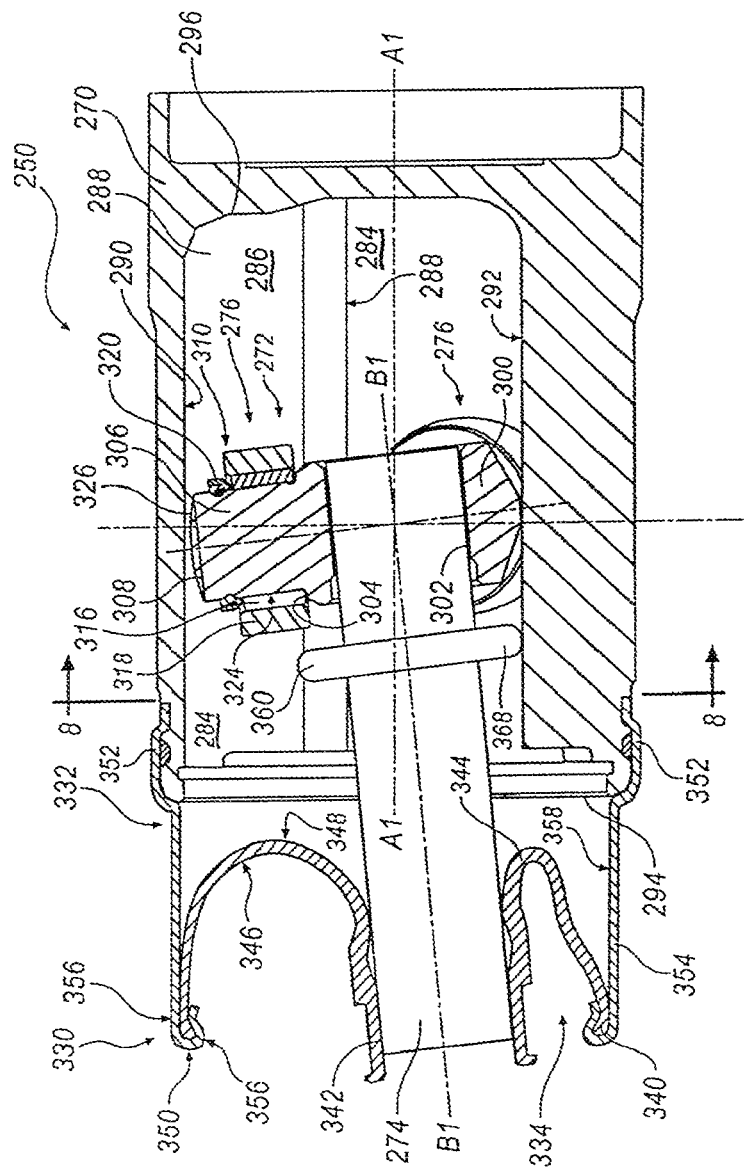
FIG. 7 is a partial sectional view of a portion of a propeller shaft.

FIG. 7 illustrates a joint 250. The joint 250 includes a tulip, or an outer joint portion, 270 connected to a front propeller shaft, such as the front propeller shaft 52, and an inner joint portion 272. The inner joint portion 272 includes a shaft 274 connected to a rear propeller shaft, such as the rear propeller shaft 54. The inner joint portion 272 also includes a tripod, or spider, 276 splined to the shaft 274. The tulip 270 is generally defined by an axis A1-A1 and the shaft 274 is generally defined by an axis B1-B1. The tulip 270 may be axially displaced relative to the shaft 274 during operation of the driveline 20, and at other times, including transport and assembly of a propeller shaft, such as propeller shaft 40.

The tulip 270 is provided with an inner recess 284 having three uniformly circumferentially distributed vaults 286. The vaults 286 form pairs of circumferentially opposed tracks 288 connected by a first inner surface, or vault major surface, 290 that extend from an opening end 294 of the tulip 270 to an annular wall 296. The tracks 288 of adjacent vaults 286 are connected by a second inner surface, or tulip minor surface, 292. The spider 276 includes an annular hub portion 300 provided with an aperture 302 for inserting the shaft 274 therein and three uniformly circumferentially distributed trunnion lands 304. As illustrated, the spider 276 is splined to the shaft 274 for rotation therewith. Extending from the hub 300 (at each trunnion land 304) are three uniformly circumferentially distributed trunnions 306 having a trunnion crown 308 at a distal end.

One trunnion 306 is interposed within each vault 286. A roller assembly 310 is interposed within each vault 286 with a trunnion 306 interposed therein. Each roller assembly 310 includes bearing needles 316 and rollers 318. Each roller 318 with bearing needles 316 is axially restrained on each trunnion 306 by a securing ring 320. The roller assemblies 310 are permitted to axially float between contact with the trunnion lands 304 and the securing rings 320.

Generally, the vault major surface 290 is defined by a first vault diameter DV, and the tulip minor surface 292 is defined by a second vault diameter dv (as indicated in FIG. 5). Each trunnion 306 includes a generally cylindrical outer surface 324 and a trunnion end 326. That is, each trunnion 306 is defined by a generally cylindrical surface that extends between a trunnion land 304 and a trunnion crown 308, where the trunnion crown 308 includes the trunnion end 326. When the spider 276 is positioned concentric to the tulip 270, a clearance is generally provided between each trunnion end 326 and vault major surface 290. The clearance between each trunnion end 326 and vault major surface 290 permits the shaft 274 to articulate relative to the tulip 270.

Figure 8:
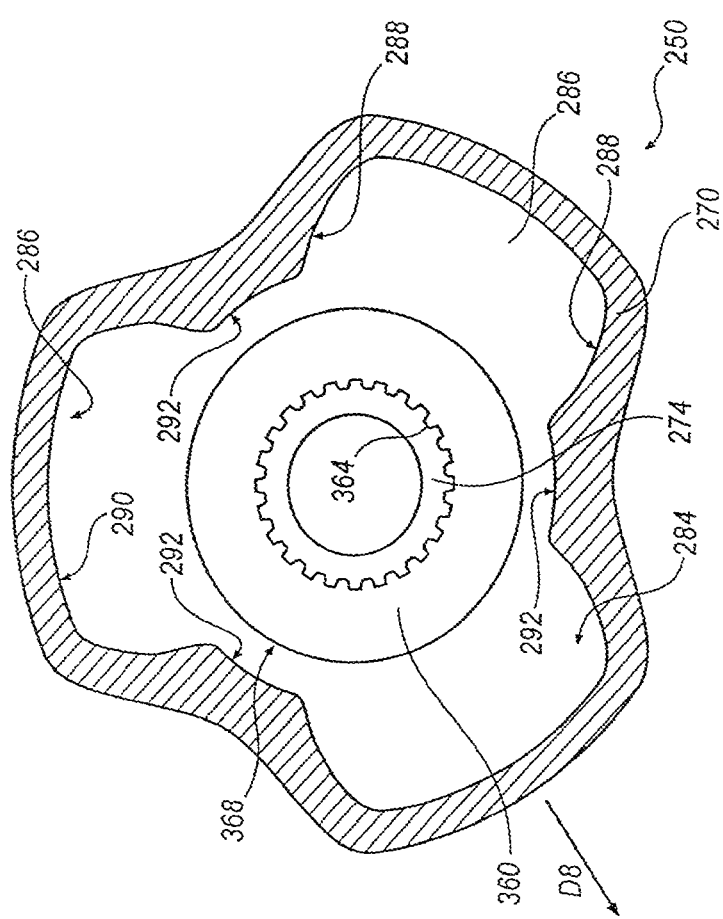
FIG. 8 is a partial sectional view taken along line 8-8 of FIG. 7.

FIG. 8 illustrates the joint 250 with spider 276 removed and the shaft 274 centered therein for clarity. As best seen in FIG. 8, the joint 250 may be trisected about the axes A1-A1 and B1-B1 into three generally equal portions. When the joint 250 is in operation with the tulip 270 and shaft 274 generally axially aligned, the rotational forces within the joint 250 urge the axes A1-A1 and B1-B1 to be co-axial and the trunnions float within the roller assemblies 310 to provide a generally equal clearance between each trunnion end 326 and vault major surface 290.

Referring again to FIG. 7, the joint 250 also includes a boot assembly 330. The boot assembly 330 includes a boot can 332 and a flexible boot 334. The flexible boot 334 includes an outer bead end 340, an inner shaft end 342, a flexible portion 344 extending therebetween, an outer boot surface 346, and an inner boot surface 348. The boot can 332 includes a crimped end 350 that is folded over the bead end 340, a tulip end 352 connected to the tulip 270, a generally cylindrical can body 354 extending therebetween, an outer can surface 356, and an inner can surface 358.

FIGS. 7 and 8 illustrate that the joint 250 may also include a limiting device, or limiting portion, 360. In the embodiment illustrated, the limiting portion 360 is a generally annular ring having a inner ring surface 364 (FIG. 8) generally fixed (splined or pressed) to the shaft 274, and a generally cylindrical outer limiting surface 368. In FIG. 7, the axis A1-A1 of the front tulip 270 is not aligned with the axis B1-B1 of the shaft 274 and the outer limiting surface 368 of the limiting portion 360 is in contact with the tulip minor surface 292. As the outer limiting surface 368 of the limiting portion 360 contacts the tulip minor surface 292, the trunnion end 326, sectionally illustrated in FIG. 7, will not contact the vault major surface 290 in the embodiment illustrated. As best seen in FIG. 8, the outer limiting surface 368 of the limiting portion 360 may contact two tulip minor surfaces 292 if the shaft 274 were articulated in the direction of arrow D8. Accordingly, articulation between the shaft 274 and the tulip 270 is arrested when the outer limiting surface 368 of the limiting portion 360 is in contact with at least one tulip minor surface 292.

Therefore, the contact between the limiting portion 360 and the tulip 270 prevents the outer can surface 356 of the crimped end 350 of the boot can 332 from contacting the outer boot surface 346 of the boot 334 during articulation of the shaft 274 relative to the tulip 270. This lack of contact between the crimped end 350 and the outer boot surface 346 prevents undesired damage to the boot 334.

When a propeller shaft, such as the propeller shaft 40, is assembled with a joint 250, manipulation of the propeller shaft when not fully installed in the driveline 20 will not result in damage to the boot 334 by the boot can 332. The outer limiting surface 368, while illustrated as generally cylindrical, may be curved, or generally toroidal, or any other suitable shape.

Figure 9:
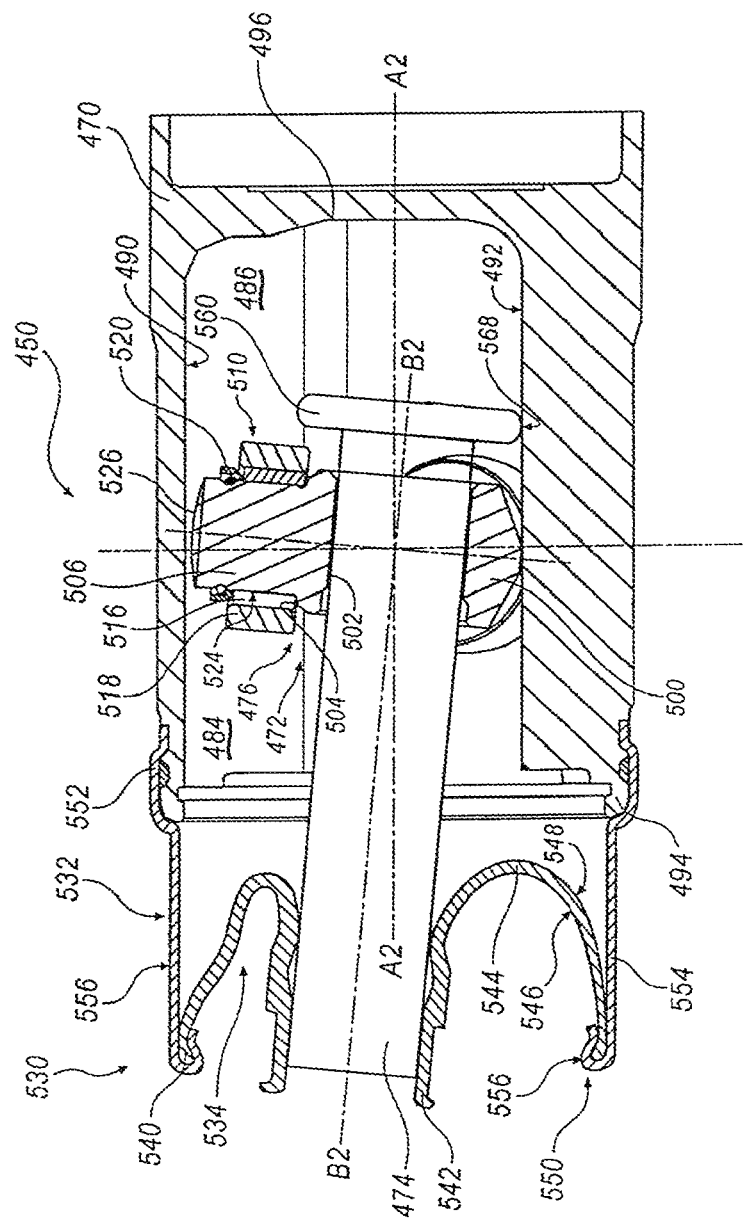
FIG. 9 is a partial sectional view of a portion of a propeller shaft.

FIG. 9 illustrates a joint 450. The joint 450 includes a tulip, or an outer joint portion, 470 connected to a front propeller shaft, such as the front propeller shaft 52, and an inner joint portion 472. The inner joint portion 472 includes a shaft 474 connected to a rear propeller shaft, such as the rear propeller shaft 54. The inner joint portion 472 also includes a tripod, or spider, 476 splined to the shaft 474. The tulip 470 is generally defined by an axis A2-A2 and the shaft 474 is generally defined by an axis B2-B2. The tulip 470 may be axially displaced relative to the shaft 474.

The tulip 470 is provided with an inner recess 484 having three uniformly circumferentially distributed vaults 486. The vaults 486 form pairs of circumferentially opposed tracks 488 connected by an vault major surface 490 that extend from an opening end 494 of the tulip 470 to an annular wall 496. The tracks 488 of adjacent vaults 486 are connected by a tulip minor surface 492. The spider 476 includes an annular hub portion 500 provided with an aperture 502 for inserting the shaft 474 therein, and three uniformly circumferentially distributed trunnion lands 504. Extending from the hub 500 are three uniformly circumferentially distributed trunnions 506. One trunnion 506 is interposed into each vault 486. A roller assembly 510 is interposed within each vault 486 with a trunnion 506 interposed therein. Each roller assembly 510 includes bearing needles 516 and rollers 518. Each roller 518 with bearing needles 516 are axially restrained on each trunnion 506 by a securing ring 520.

Each trunnion 506 includes a cylindrical outer surface 524 and a trunnion end 526. When the spider 476 is positioned concentric to the tulip 470, a clearance is generally provided between each trunnion end 526 and vault major surface 490.

The clearance between each trunnion end 526 and vault major surface 490 permits the shaft 474 to articulate relative to the tulip 470.

The joint 450 also includes a boot assembly 530. The boot assembly 530 includes a boot can 532 and a flexible boot 534. The flexible boot 534 includes an outer bead end 540, an inner shaft end 542, a flexible portion 544 extending therebetween, an outer boot surface 546, and an inner boot surface 548. The boot can 532 includes a crimped end 550 that is folded over the bead end 540, a tulip end 552 connected to the tulip 470, a generally cylindrical can body 554 extending therebetween, and a can outer surface 556.

The joint 450 also includes a limiting portion 560. As illustrated in FIG. 9, the limiting portion 560 is an annular ring with a generally cylindrical outer limiting surface 568 that is attached to the shaft 474. The limiting portion 560 extends from the shaft 474 between the spider 476 and the wall 496, although the limiting portion 560 may be positioned between the spider 476 and the opening end 494. As illustrated, the axis A2-A2 of the tulip 470 is not aligned with the axis B2-B2 of the shaft 474 and the outer limiting surface 568 of the limiting portion 560 is in contact with the tulip minor surface 492. As the outer limiting surface 568 of the limiting portion 560 contacts the tulip minor surface 492, the trunnion end 526, may contact the vault major surface 490. The articulation of the shaft 474 relative to the tulip 470 is arrested when the outer limiting surface 568 of the limiting portion 560 is in contact with the tulip minor surface 492 and when one trunnion end 526 may be in contact with the vault major surface 490.

Therefore, the contact between the limiting portion 560 and the tulip 470 prevents the crimped end 550 of the boot can 532 from contacting the outer boot surface 546 of the boot 534 during articulation of the shaft 474 relative to the tulip 470. This lack of contact between the crimped end 550 and the outer boot surface 546 prevents undesired damage in the boot 534.

When a propeller shaft, such as the propeller shaft 40, is assembled with a joint 450, manipulation of the propeller shaft when not fully installed in the driveline 20 will not result in damage to the boot 534 by the boot can 532. The outer limiting surface 568, while illustrated as generally cylindrical, may be curved or generally toroidal, or any other suitable shape.

Figure 10:
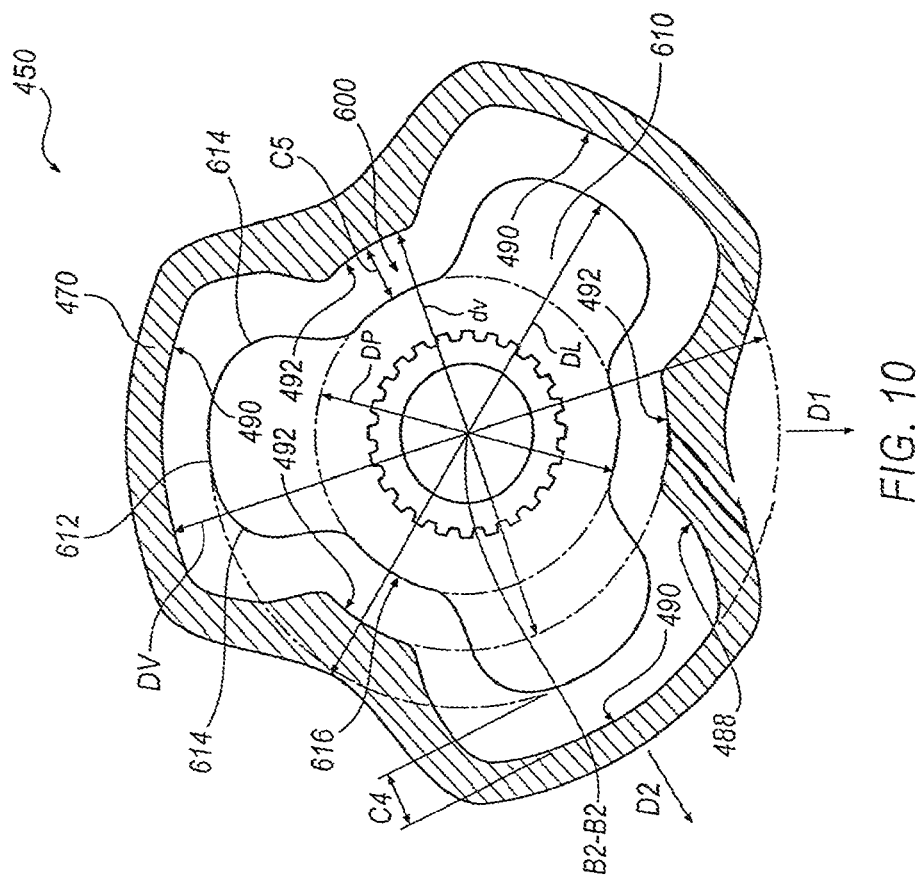
FIG. 10 is a sectional view of the portion of a propeller shaft.

FIG. 10 illustrates an alternative of the limiting portion 560 as a limiting portion 600 positioned within the joint 450, with the spider 476 removed and the shaft 474 centered within the tulip 470 for clarity. The limiting portion 600 includes three generally equally circumferentially spaced lobes 610 each having an distal diameter lobe surface 612 and a pair of opposing surfaces 614. The lobes 610 are separated by three proximal diameter surfaces 616. As illustrated generally centered in the joint 450, the lobes 610 extend from the limiting portion 600 toward the vault major surface 490 with a clearance C4 between the vault major surface 490 and the distal diameter lobe surface 612. Also, a clearance C5, measured generally radially to the axis B2-B2, is provided between the tulip minor surface 492 and the proximal diameter surfaces 616. Generally, the vault major surface 490 is defined by a first vault diameter DV, and the tulip minor surface 492 is defined by a second vault diameter dv (as indicated in FIG. 10). Also, the distal diameter lobe surfaces 612 define an outer lobe diameter DL and the proximal diameter surfaces 616 define a proximal diameter DP. As illustrated, the first vault diameter DV is larger than the outer lobe diameter DL which is larger than the second vault diameter dv which is larger than the proximal diameter DP.

In operation, the limiting portion 600 limits the articulation of the tulip 470 relative to the shaft 474. When articulation of the tulip 470 relative to the shaft 474 moves the limiting device in direction D2 relative to at least a portion of the tulip 470, the vault major surface 490 will contact the distal diameter lobe surface 612, thereby preventing further articulation. When articulation of the tulip 470 relative to the shaft 474 moves the limiting device in direction D1, the tulip minor surface 492 will contact the proximal diameter surfaces 616, thereby preventing further articulation. As in the illustrative example of FIG. 7, the articulation of the tulip 270 relative to the shaft 274 where the limiting portion 360 prevents contact between the boot can 332 and the boot 334, the limiting device 600 prevents damage to the boot 534 when installed in a joint 450.

While the limiting device 600 is illustrated as positioned between the spider 476 and the wall 496 (between the spider 476 and a front propeller shaft, such as the front propeller shaft 52), the limiting device 600 may be positioned between the spider 476 and the opening end 494 (between the spider 476 and a rear propeller shaft, such as the rear propeller shaft 54).

Figure 11:
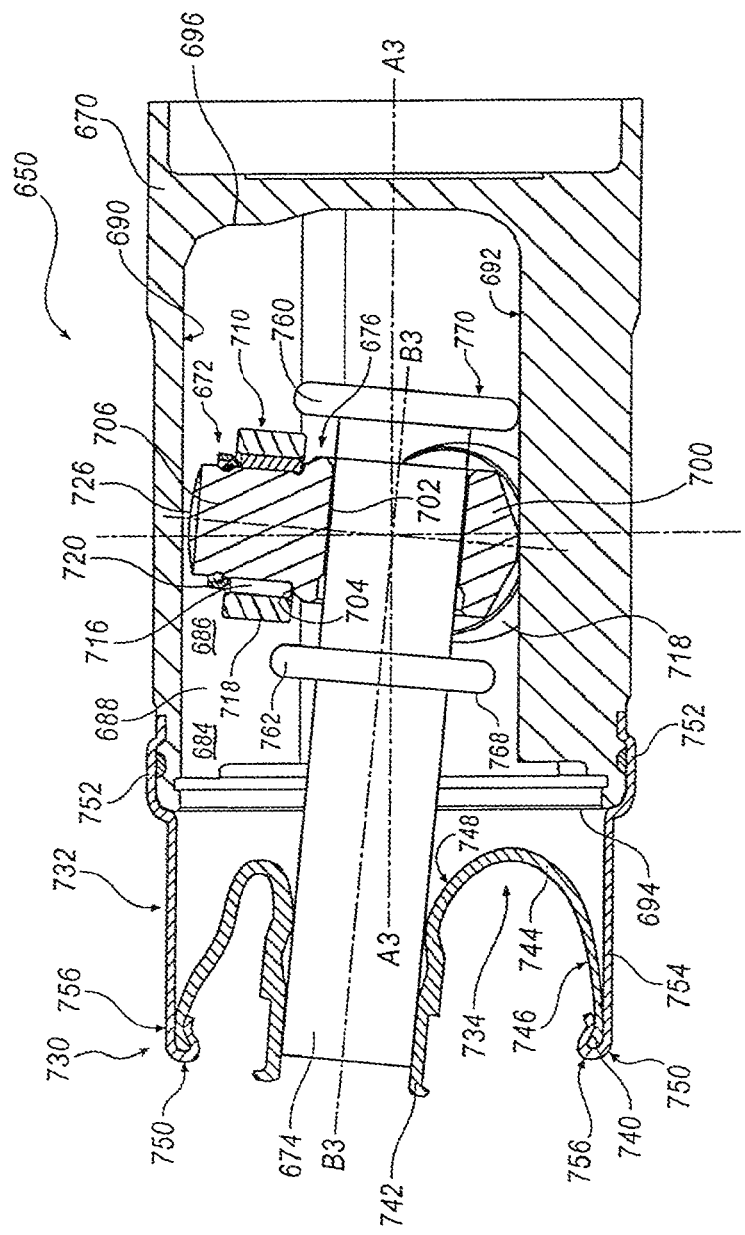
FIG. 11 is a partial sectional view of a portion of a propeller shaft.

FIG. 11 illustrates another embodiment of a joint 50 as a joint 650. The joint 650 includes a tulip, or an outer joint portion, 670 connected to a front propeller shaft, such as the front propeller shaft 52, and an inner joint portion 672. The inner joint portion 672 includes a shaft 674 connected to a rear propeller shaft, such as rear propeller shaft 54. The inner joint portion 672 also includes a tripod, or spider, 676 splined to the shaft 674. The tulip 670 is generally defined by an axis A3-A3 and the shaft 674 is generally defined by an axis B3-B3. The tulip 670 may be axially displaced relative to the shaft 674.

The tulip 670 is provided with an inner recess 684 having three uniformly circumferentially distributed vaults 686. The vaults 686 form pairs of circumferentially opposed tracks 688 connected by an vault major surface 690 that extend from an opening end 694 of the tulip 670 to an annular wall 696. The tracks 688 of adjacent vaults 686 are connected by a tulip minor surface 692. The spider 676 includes an annular hub portion 700 provided with an aperture 702 for inserting the shaft 674 therein and three uniformly circumferentially distributed trunnion lands 704. Extending from the hub 700 are three uniformly circumferentially distributed trunnions 706. One trunnion 706 is interposed into each vault 686. A roller assembly 710 is interposed within each vault 686 with a trunnion 706 interposed therein. Each roller assembly 710 includes bearing needles 716 and rollers 718. Each roller 718 with bearing needles 716 are axially restrained on each trunnion 706 by a securing ring 720.

Each trunnion 706 includes a trunnion end 726. When the spider 676 is positioned concentric to the tulip 670, a clearance is generally provided between each trunnion end 726 and vault major surface 690. The clearance between each trunnion end 726 and vault major surface 690 permits the shaft 674 to articulate relative to the tulip 670.

The joint 650 also includes a boot assembly 730. The boot assembly 730 includes a boot can 732 and a flexible boot 734. The flexible boot 734 includes an outer bead end 740, an inner shaft end 742, a flexible portion 744 extending therebetween, an outer boot surface 746, and an inner boot surface 748. The boot can 732 includes a crimped end 750 that is folded over the bead end 740, a tulip end 752 connected to the tulip 670, a generally cylindrical can body 754 extending therebetween, and a can outer surface 756.

The joint 650 also includes a pair of limiting portions 760, 762. In the embodiment illustrated, the limiting portions 760, 762 are annular rings with respective generally cylindrical outer limiting surfaces 770, 768 that are attached to the shaft 670. In the embodiment illustrated, the axis A3-A3 of the tulip 670 is not aligned with the axis B3-B3 of the shaft 674 and the outer limiting surface 770 of the limiting portion 760 is in contact with the tulip minor surface 692.

As the shaft 674 is non-axially rotated relative to the tulip 670, the outer limiting surface 770 of the limiting portion 760 rotates toward the tulip minor surface 692. When the outer limiting surface 768 of the limiting portion 762, or the outer limiting surface 770 of the limiting portion 760, contacts the tulip minor surface 692, the trunnion end 726 may also contact the vault major surface 690. The articulation between the shaft 674 and the tulip 670 is arrested when the outer limiting surface 768, 770 of the limiting portion 762, 760 is in contact with the tulip minor surface 692 and when one trunnion end 726 may be in contact with the vault major surface 690.

Therefore, the contact between one of the limiting portions 760, 762 and the tulip 670 will limit the articulation of the shaft 674 relative to the tulip 670 and prevent the crimped end 750 of the boot can 732 from contacting the outer boot surface 746 of the boot 734 during articulation of the tulip 670 relative to the shaft 674. This lack of contact between the crimped end 750 and the outer boot surface 746 prevents undesired damage in the boot 734.

When a propeller shaft, such as the propeller shaft 40, is assembled with a joint 650, manipulation of the propeller shaft when not fully installed in the driveline 20 will not result in damage to the boot 734 by the boot can 732. Again, while limiting portions 760, 762 are illustrated as generally cylindrical, they may be curved, generally toroidal or any other suitable shape.

Figure 12:
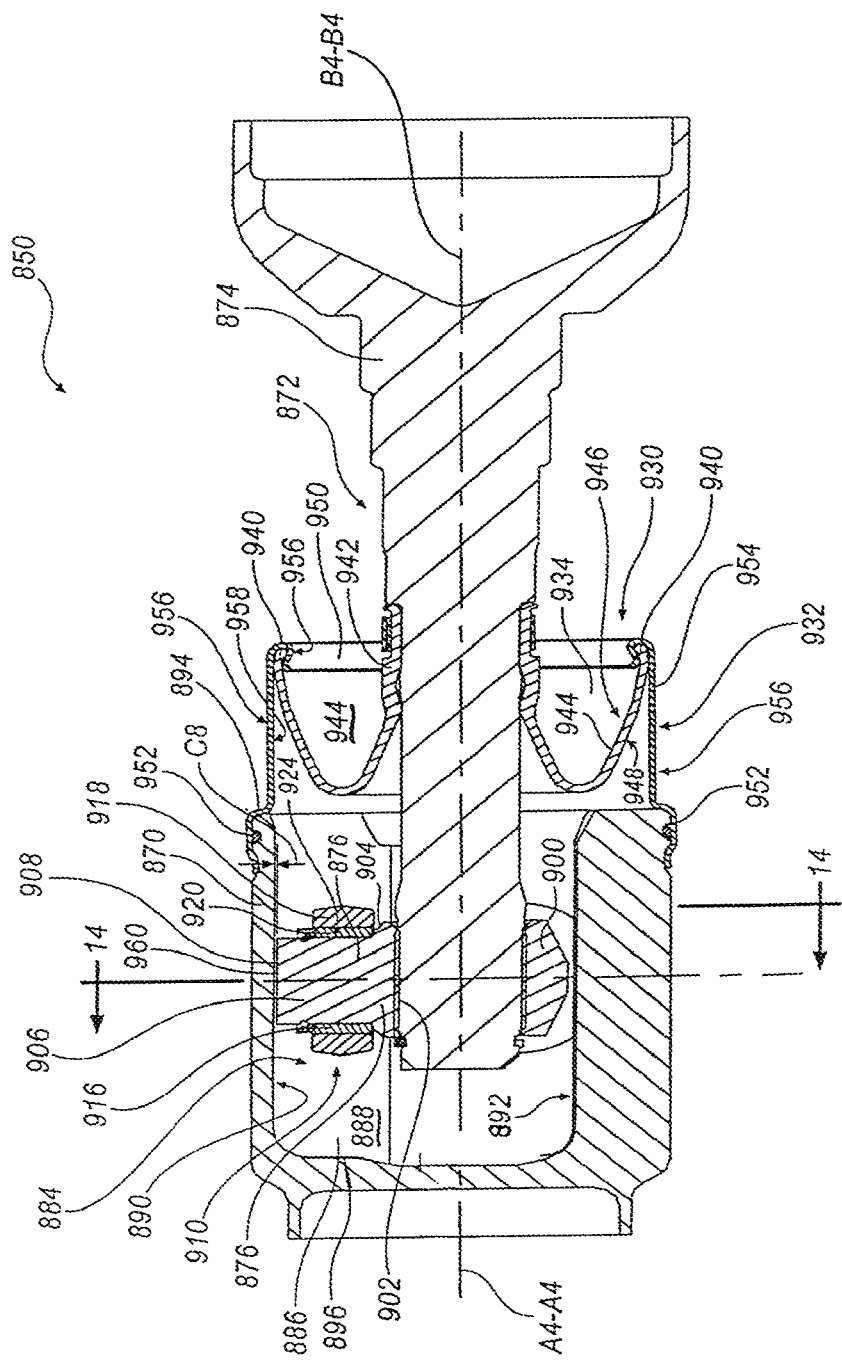
FIG. 12 is a partial sectional view of a portion of a propeller shaft.
Figure 13:
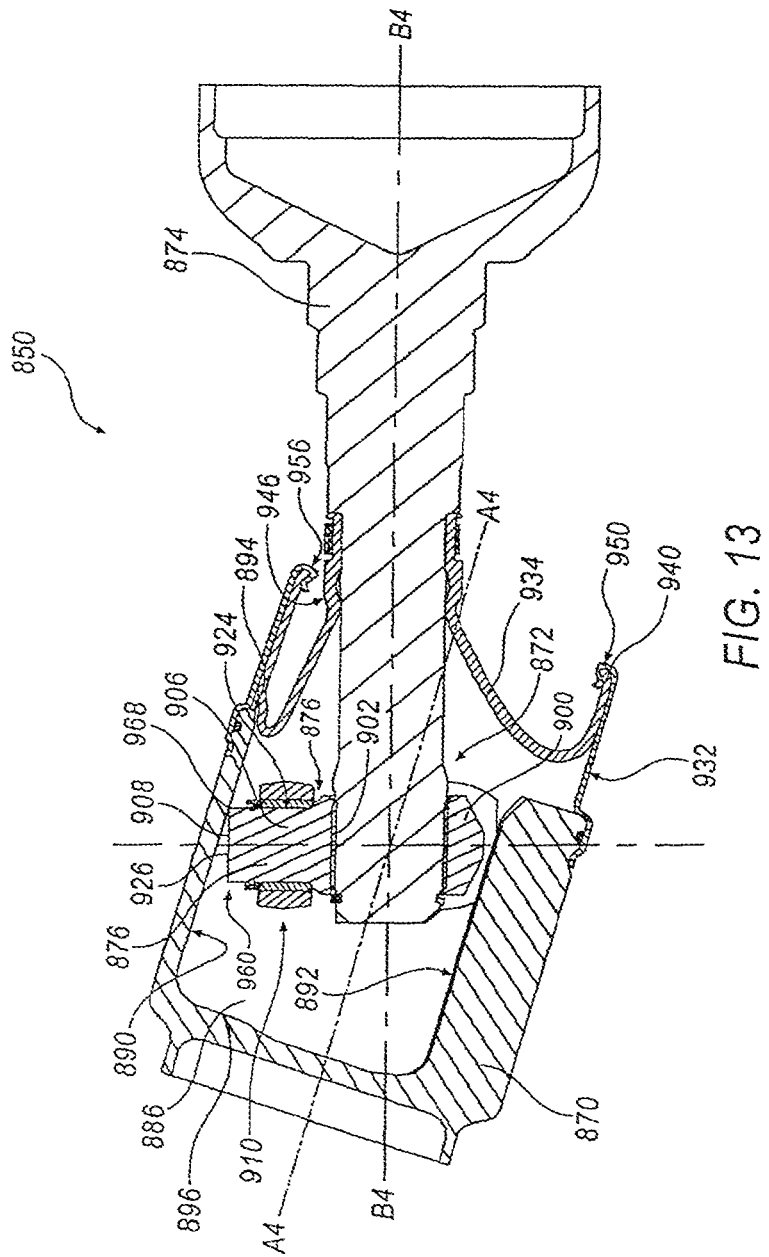
FIG. 13 is a sectional view of the portion of the propeller shaft of FIG. 12 illustrated in a second configuration.
Figure 14:
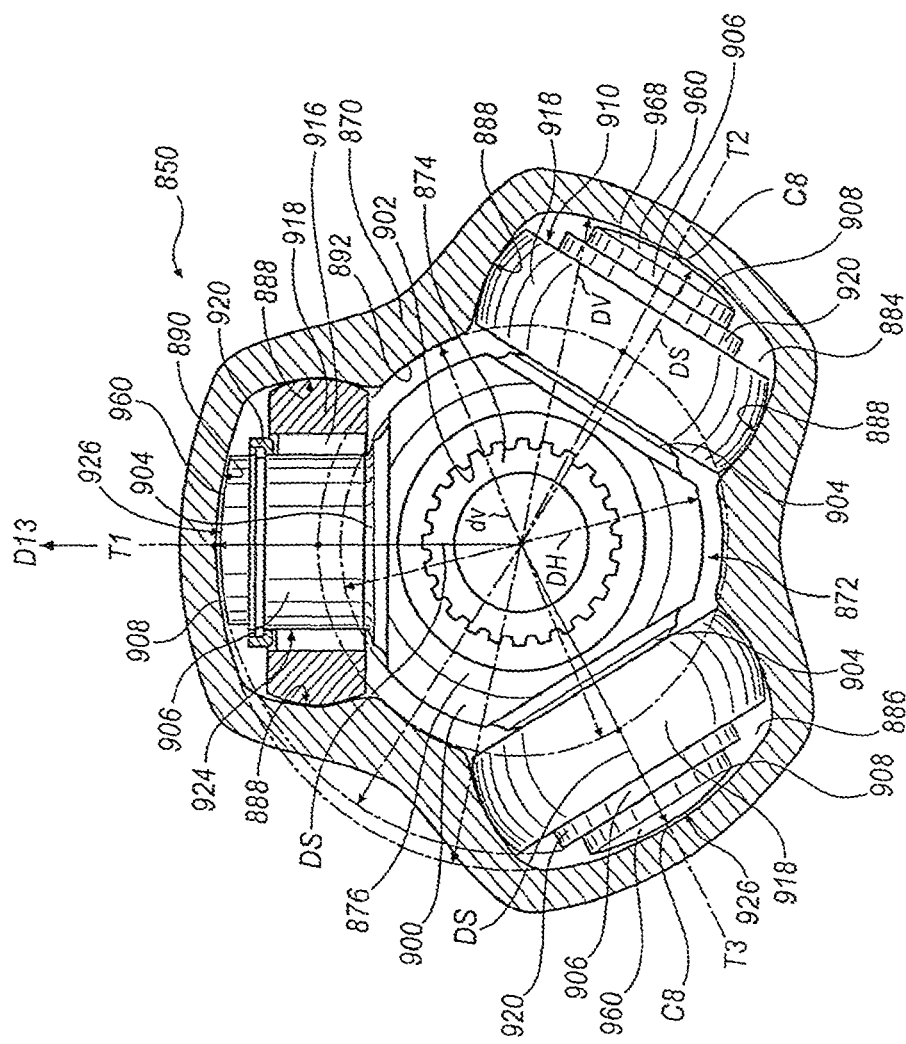
FIG. 14 is a sectional view taken along line 14-14 of FIG. 12.

FIGS. 12-14 illustrate a further embodiment of a joint 50 as a joint 850. The joint 850 includes a tulip, or an outer joint portion, 870 connected to a front propeller shaft, such as the front propeller shaft 52, and an inner joint portion 872. The inner joint portion 872 includes a shaft 874 connected to a rear propeller shaft, such as the rear propeller shaft 54. The inner joint portion 872 also includes a tripod, or spider, 876 splined to the shaft 874. The tulip 870 is generally defined by an axis A4-A4 and the shaft 874 is generally defined by an axis B4-B4. The tulip 870 may be axially displaced relative to the shaft 874 during operation of the driveline 20, and at other times, including transport and assembly of a propeller shaft, such as propeller shaft 40.

The tulip 870 is provided with an inner recess 884 having three uniformly circumferentially distributed vaults 886. The vaults 886 form pairs of circumferentially opposed tracks 888 connected by a first inner surface, or vault major surface, 890 that extend from an opening end 894 of the tulip 870 to an annular wall 896. The tracks 888 of adjacent vaults 886 are connected by a second inner surface, or tulip minor surface, 892. The spider 876 includes an annular hub portion 900 provided with an aperture 902 for inserting the shaft 874 therein and three uniformly circumferentially distributed trunnion lands 904. As illustrated, the spider 876 is splined to the shaft 874 for rotation therewith. Extending from the hub 900 at each trunnion land 904 are three uniformly circumferentially distributed trunnions 906 having axes T1, T2, and T3 (see FIG. 14) having a trunnion crown 908 at a distal end.

One trunnion 906 is interposed within each vault 886. A roller assembly 910 is interposed within each vault 886 with a trunnion 906 interposed therein. Each roller assembly 910 includes bearing needles 916 and rollers 918. Each roller 918 with bearing needles 916 is axially restrained on each trunnion 906 by a securing ring 920. The roller assemblies 910 are permitted to axially float along axes T1, T2, T3 between contact with the trunnion lands 904 and the securing rings 920. As illustrated, the rollers 918 mate with the tracks 888 at engaging curved surfaces.

Each trunnion 906 includes a generally cylindrical outer surface 924 and a trunnion end 926. That is, each trunnion 906 is defined by a generally cylindrical surface that extends between a trunnion land 904 and a trunnion crown 908, where the trunnion crown 908 includes the trunnion end 926. When the spider 876 is positioned concentric to the tulip 870, a clearance C8 is generally provided between each trunnion end 926 and vault major surface 890. The clearance C8 between each trunnion end 926 and vault major surface 890 permits the shaft 874 to articulate relative to the tulip 870.

As illustrated in FIG. 14, the joint 850 may be trisected about the axes A4-A4 and B4-B4 into three generally equal portions. When the joint 850 is in operation with the tulip 870 and shaft 874 generally axially aligned, the rotational forces within the joint 850 urge the axes A4-A4 and B4-B4 to be co-axial and the trunnions float within the roller assemblies 910 to provide a generally equal clearance C8 between each trunnion crown 908 and vault major surface 890.

Generally, the vault major surface 890 is defined by a first vault diameter DV, and the tulip minor surface 892 is defined by a second vault diameter dv (as indicated in FIG. 14). The hub 900 defines an outer hub diameter DH.

A trunnion radius DS is measured between the axis B4-B4 and the trunnion end 926. That is, the outermost portion of the trunnion 906 extending from the rotation point along axis B4-B4 is a distance DS from the axis B4-B4. Accordingly, when the trunnion height DS is increased for a joint, such as the joint 850, the maximum angle of articulation (measured between axis A4-A4 and axis B4-B4 of FIG. 13) is decreased. As an example, a trunnion radius DS of 31.011 millimeters (mm) and a first vault diameter DV of 62.60 mm would result in an angle of articulation of about 22 degrees. In this example, the joint would not articulate beyond a relative angle between axis A4-A4 and axis B4-B4 of about 22 degrees. Further, the operation of this joint within a driveline, such as the driveline 20, would not require articulation beyond 22 degrees. In this example, the ratio of the vault diameter DV to the trunnion radius DS would be about 2.02. The present invention defines a ratio of the vault diameter DV to the trunnion radius DS of about 1.95 to about 2.05 as desirable, while a ratio of the vault diameter DV to the trunnion radius DS of about 1.98 to about 2.02 as more desirable.

The joint 850 also includes a boot assembly 930. The boot assembly 930 includes a boot can 932 and a flexible boot 934. The flexible boot 934 includes an outer bead end 940, an inner shaft end 942, a flexible portion 944 extending therebetween, an outer boot surface 946, and an inner boot surface 948. The boot can 932 includes a crimped end 950 that is folded over the bead end 940, a tulip end 952 connected to the tulip 870, a generally cylindrical can body 954 extending therebetween, an outer can surface 956, and an inner can surface 958.

FIGS. 12-14 illustrate that the joint 850 may also include a limiting portion 960. In the embodiment illustrated, the limiting portion 960 includes three outer limiting surfaces 968 which are defined by the trunnion crowns 908 and the trunnion ends 926. The outer limiting surface 968, while illustrated as generally cylindrical, may be curved, or generally toroidal, or any other suitable shape. FIGS. 12 and 14 illustrate the joint 850 in a first configuration where the axis A4-A4 of the front tulip 870 is generally aligned with the axis B4-B4 of the shaft 874.

FIG. 13 illustrates the joint 850 in a limited configuration. In the limited configuration, the axis A4-A4 of the front tulip 870 is not aligned with the axis B4-B4 of the shaft 874 and a trunnion crown 908 of the limiting portion 960 is in contact with the vault major surface 890. Articulation between the shaft 874 and the tulip 870 is arrested when the outer limiting surface 968 of the crown 908 of the limiting portion 960 is in contact with the vault major surface 890.

Therefore, the contact between the limiting portion 960 and the tulip 870 prevents the outer can surface 956 of the crimped end 950 of the boot can 932 from contacting the outer boot surface 946 of the boot 934 during articulation of the tulip 870 relative to the shaft 874. This lack of contact between the crimped end 950 and the outer boot surface 946 prevents undesired damage to the boot 934.

In the limited configuration illustrated in FIG. 13, the hub 900 does not contact the tulip minor surface 892 although the hub may contact the tulip minor surface in other embodiments. As illustrated in the limited configuration of FIG. 13, and with reference to FIG. 14, when the shaft 874 is rotated in the direction D13 relative to the tulip 870, the spider 876 rotates the rollers 918, and the rollers 918 interposed on trunnions 906 defining axes T2 and T3 will limit radial movement of the spider 876 as the limiting portion 960 contacts the roller 918 interposed on the trunnion 906 defining axis T1, and the rollers 918 interposed on trunnions 906 defining axes T2 and T3 contact their respective trunnion lands 904 and the rollers 918 interposed on trunnions 906 defining axes T2 and T3 are limited in moving along axes T2 and T3 due to the interaction between the curved surfaces of the rollers 918 and the tracks 888.

When a propeller shaft, such as the propeller shaft 40, is assembled with a joint 850, manipulation of the propeller shaft when not fully installed in the driveline 20 will not result in damage to the boot 934 by the boot can 932.

While FIG. 6 illustrates that shaft 74 may articulate relative to the tulip 70 until the outer can surface 156 of the crimped end 150 of the boot can 132 contacts the outer boot surface 146 of the boot 134, contact with or damage to a boot may not be of concern when using limiting portions, such as the limiting portions 360, 560, 760, 762 and/or 960 to limit articulation of joints. That is, limiting articulation of joints need not be directed to the illustrative applications presented herein.

The portions 360, 560, 760, 762, 960 permit a desired amount of articulation of the joint when installed, while preventing undesired angles of articulation that may result in damage to the boot. In the embodiments illustrated, the limiting portions 360, 560, 760, 762 are metal alloy, although other materials, such as high density polyethylene (HDPE) may be used. While the limiting portions 360, 560, 760, 762 are illustrated and described herein as fixed to a shaft, the limiting devices may axially rotate relative to the shaft, may axially translate relative to the shaft, or may otherwise move relative to the shaft. Additionally, the outer surfaces of the rollers 118, 318, 518, 718, 918, while illustrated in various shapes such as cylindrical, curved and spherical, may be any suitable shape, and may limit radial movement of the spiders 76, 276, 476, 676, 876 as described herein, to work in conjunction with the limiting devices described herein.

As used herein, articulation of a joint involves non-axial rotation of one portion of the joint relative to another portion of the joint. Generally, this involves non-axial rotation as viewed, for example, in comparing FIG. 12 to FIG. 13.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

The invention claimed is:

1. A constant velocity joint comprising:
an outer joint portion having an opening end, an outer joint axis, and an outer joint inside surface defining, at least in part, an internal vault;
an inner joint portion including a spider interposed within the outer joint portion and a shaft extending through the opening end, wherein the spider includes a trunnion, the trunnion is at least partially interposed within the vault, and the shaft defines a shaft axis, and wherein the inner joint portion includes an angular range of motion limiting device that selectively restricts the articulation of the shaft relative to the outer joint portion to prevent the shaft from contacting the outer joint; and
a boot assembly including a boot can and a boot, wherein the boot can has a tulip end connected to the outer joint portion and a crimped end connected to the boot, the boot has a boot outer surface and shaft end connected to the shaft, and wherein articulation of the shaft relative to the outer joint portion will result in the limiting device contacting the outer joint portion, thereby preventing contact between an outside surface of the boot and an outside surface of the boot can.

2. The joint of claim 1, wherein the limiting device selectively prevents the shaft from contacting the outer joint inside surface.

3. The joint of claim 1, wherein the limiting device is a trunnion crown that selectively contacts the outer joint portion inside surface.

4. The joint of claim 1, wherein the limiting device interferes with the outer joint portion such that the boot is not bindingly engaged between the boot can and the shaft.

5. The joint of claim 1, wherein the limiting device is affixed to the shaft.

6. The joint of claim 5, wherein the limiting device includes a plurality of lobes, at least one lobe selectively contacts a surface of the vault thereby permitting the limiting device to limit articulation of the shaft relative to the outer joint portion.

7. An articulated joint comprising:
a tulip having an opening end, a tulip axis, and an tulip inside surface defining, at least in part, an internal vault;
an inner joint portion including a spider interposed within the tulip and a shaft extending from the spider and through the opening end, wherein the spider includes a trunnion, the trunnion is at least partially interposed within the vault, and the shaft defines a shaft axis, and wherein the inner joint portion includes a limiting device that selectively restricts the articulation of the shaft relative to the tulip to prevent the shaft from contacting the tulip; and
a boot assembly including a boot can and a boot, wherein the boot can has a first cover end connected to the tulip and a second cover end connected to the boot, the boot has a boot outer surface and shaft end connected to the shaft, and wherein selective articulation of the shaft relative to the tulip will result in the limiting device interfering with the tulip such that the boot is not bindingly engaged between the boot can and the shaft;

wherein the limiting device prevents contact between an outside surface of the boot and an outside surface of the boot can.

8. The joint of claim 7, wherein the limiting device selectively prevents the shaft from contacting the tulip inside surface.

9. The joint of claim 7, wherein the limiting device is a trunnion crown that contacts the tulip inside surface.

10. The joint of claim 7, wherein the limiting device includes a lobe, and selective contact between the lobe and a surface of the vault will prevent a portion of the boot can from contacting a portion of the boot.

11. The joint of claim 7, wherein the tulip has three vaults, the spider has a generally cylindrical trunnion extending into each vault, and wherein each trunnion is circumscribed by a roller assembly that contacts a surface portion of at least one of the three vaults.

12. The joint of claim 7, wherein the tulip inside surface includes a first inner surface and a second inner surface, the first inner surface generally defines a first vault diameter, the second inner surface generally defines a second vault diameter, the vault major diameter is larger than the vault minor diameter, and wherein the limiting device contacts one of the first inner surface and the second inner surface.

13. A drive shaft comprising:

an articulated joint interconnecting a first propeller shaft to a second propeller shaft, the joint including an outer joint portion and an inner joint portion, the outer joint portion having an opening end, an outer joint axis, and an outer joint inside surface defining, at least in part, an internal vault, the inner joint portion including a spider interposed within the outer joint portion and a shaft extending through the opening end, wherein the spider includes a trunnion, the trunnion is at least partially interposed within the vault, the shaft defines a shaft axis, and wherein the inner joint portion includes an angular range of motion limiting device that selectively restricts the articulation of the shaft relative to the outer joint portion to prevent the shaft from contacting the outer joint; and a boot assembly including a boot can and a boot, wherein the boot can has a first cover end connected to the outer joint portion and a second cover end connected to the boot, the boot has a boot outer surface and shaft end connected to the shaft, and wherein articulation of the shaft relative to the outer joint portion will result in the limiting device contacting the outer joint portion, thereby preventing contact between an outside surface of the boot and an outside surface of the boot can.

14. The drive shaft of claim 13, wherein the limiting device is a trunnion crown extending from the trunnion toward a surface of the vault, and the trunnion crown selectively contacts a portion of the surface of the vault to restrict articulation of the shaft relative to the outer joint portion.

15. The drive shaft of claim 13, wherein the limiting device is selectively positioned between the spider and the first propeller shaft.

16. The drive shaft of claim 13, wherein the limiting device is selectively positioned between the spider and the second propeller shaft.

* * * * *